(12) United States Patent
Lewicke

(10) Patent No.: US 7,533,579 B2
(45) Date of Patent: May 19, 2009

(54) REDUCED BORE VORTEX FLOWMETER HAVING A STEPPED INTAKE

(75) Inventor: Joseph J. Lewicke, Foxboro, MA (US)

(73) Assignee: Invensys Systems, Inc., Foxboro, MA (US)

( * ) Notice: Subject to any disclaimer, the term of this patent is extended or adjusted under 35 U.S.C. 154(b) by 0 days.

(21) Appl. No.: 11/654,747

(22) Filed: Jan. 18, 2007

(65) Prior Publication Data

US 2007/0163361 A1  Jul. 19, 2007

Related U.S. Application Data

(60) Provisional application No. 60/760,212, filed on Jan. 19, 2006.

(51) Int. Cl.
 *G01F 1/32* (2006.01)
(52) U.S. Cl. .............................. 73/861.22; 73/861.64
(58) Field of Classification Search ............. 73/861.22, 73/861.63
See application file for complete search history.

(56) References Cited

U.S. PATENT DOCUMENTS

| 3,722,275 | A | * | 3/1973 | Rodely et al. ............. 73/861.22 |
|---|---|---|---|---|
| 3,864,972 | A | * | 2/1975 | Burgess et al. ............ 73/861.22 |
| 4,015,472 | A | * | 4/1977 | Herzl ...................... 73/861.22 |
| 4,220,046 | A | * | 9/1980 | Sqourakes ................ 73/861.22 |
| 4,228,768 | A | * | 10/1980 | Kita ........................ 73/861.22 |
| 4,339,957 | A |   | 7/1982 | Herzl |
| 4,404,859 | A | * | 9/1983 | Ohsawa et al. ............ 73/861.18 |
| 4,437,349 | A | * | 3/1984 | Joy .......................... 73/861.22 |
| 4,869,099 | A | * | 9/1989 | Takahashi et al. ........... 73/118.2 |
| 5,020,373 | A | * | 6/1991 | Kamiunten et al. ........ 73/861.22 |
| 5,029,465 | A | * | 7/1991 | Tanimura et al. ........... 73/118.2 |
| 5,052,229 | A | * | 10/1991 | Tanimura et al. ......... 73/861.22 |
| 5,109,703 | A | * | 5/1992 | Tanimura et al. ......... 73/861.22 |
| 5,170,671 | A |   | 12/1992 | Miau |
| 5,398,548 | A | * | 3/1995 | Ono ............................ 73/202 |
| 6,003,383 | A | * | 12/1999 | Zielinska et al. ......... 73/861.22 |
| 6,298,734 | B1 | * | 10/2001 | Storer et al. .............. 73/861.22 |
| 6,615,673 | B1 | * | 9/2003 | Cullie ...................... 73/861.22 |
| 6,651,512 | B1 | * | 11/2003 | Kleven et al. ............. 73/861.22 |
| 6,658,945 | B1 | * | 12/2003 | Kleven ..................... 73/861.22 |
| 6,910,387 | B2 | * | 6/2005 | Koudal et al. ............. 73/861.22 |
| 7,082,840 | B2 |   | 8/2006 | Bengtson |
| 2005/0092101 | A1 |   | 5/2005 | Bengtson |
| 2008/0072686 | A1 | * | 3/2008 | Hoecker ................... 73/861.22 |

* cited by examiner

*Primary Examiner*—Harshad Patel
(74) *Attorney, Agent, or Firm*—Sampson & Associates P.C.

(57) ABSTRACT

A reduced bore vortex flowmeter and flowmeter body includes a fluid inlet couplable in series to an upstream portion of a fluid flow conduit. The inlet fairs into a central bore having a transverse cross-sectional dimension less than that of the conduit, and which houses a shedder. The central bore is communicably coupled to a fluid outlet couplable to a downstream portion of the conduit. The inlet has a stepped or structured inner wall, including a first wall portion disposed at first angle to the downstream direction, and a second wall portion disposed at a second angle to the downstream direction. The second angle is greater than the first angle, so that the first and second wall portions form a substantially concave axial cross-section. The stepped intake improves linearity of flow measurements by reducing velocity profile errors and/or extending contracted flow to the shedder over a relatively wide flow range.

24 Claims, 8 Drawing Sheets

REDUCED BORE VORTEX FLOWMETER HAVING A STEPPED INTAKE

RELATED APPLICATION

This application claims priority to U.S. Provisional Patent Application Ser. No. 60/760,212 entitled Reduced Bore Vortex Flowmeter having a Stepped Intake, filed on Jan. 19, 2006.

TECHNICAL FIELD

This invention relates to flowmeters and more particularly to vortex flowmeters.

BACKGROUND INFORMATION

Throughout this application, various publications, patents and published patent applications are referred to by an identifying citation. The disclosures of the publications, patents and published patent applications referenced in this application are hereby incorporated by reference into the present disclosure.

Vortex flowmeters are commonly installed in-line within a process-fluid flow conduit to measure the rate of fluid flow therethrough. These meters are available in a wide range of sizes, e.g., to match the inner diameters (IDs) of various-sized conduits. Vortex flowmeters are available in a range of standardized sizes, including those having IDs of ½, ¾, 1, 1.5, 2, 3, 4, 6, 8, 10 or 12 inches.

Frequently, however, process-fluid flow conduits are oversized for the particular process flow requirements, such as to allow for anticipated future increases in demand. A consequence of this oversizing is that the fluid within this conduit, and within the bore of a matching vortex flowmeter, may be flowing at an undesirably low velocity. Those skilled in the art will recognize that low velocity may adversely affect the performance of the flowmeter.

One potential solution to this problem is to install smaller sized flowmeters into these relatively large size conduits, such as with reducers in the form of conically tapered flanges. However, the linearity of measurement tends to decrease as the bore size is reduced, and performance characteristics of reduced bore meters may result in degraded linearity and/or reduction of operating range for a given linearity (e.g., greater than a 1% variation over its range of operation) for many applications.

There is therefore a need to provide vortex flowmeters capable of providing accurate and relatively linear fluid flow measurements at reduced bore sizes.

SUMMARY

In accordance with one aspect of the invention, a reduced bore vortex flowmeter body includes a tubular fluid inlet configured for being coupled in series to an upstream portion of a fluid flow conduit. The fluid inlet fairs into a central bore having a transverse cross-sectional dimension less than that of the conduit. A shedder is disposed within the central bore. The central bore is communicably coupled to a tubular fluid outlet, which is configured for being coupled to a downstream portion of the conduit. The fluid inlet has a stepped inner wall, including a first wall portion disposed at first angle to the downstream direction, and a second wall portion disposed at a second angle to the downstream direction. The second angle is greater than the first angle, so that the first and second wall portions form a substantially concave axial cross-section.

In another aspect, a method of measuring fluid flow includes coupling a tubular fluid inlet in series to an upstream portion of a fluid flow conduit, the fluid inlet having a stepped inner wall including a first wall portion disposed at first angle to the downstream direction, and a second wall portion disposed at a second angle to the downstream direction. The second wall portion is downstream of the first wall portion, and the second angle is larger than the first angle, so that the first and second wall portions form a substantially concave axial cross-section. The method also includes coupling the fluid inlet to a central bore having a transverse cross-sectional dimension less than that of the conduit, the central bore having a shedder disposed therein. The central bore is coupled to a tubular fluid outlet, which is coupled to a downstream portion of the conduit. The process fluid is conveyed downstream through the conduit, and the frequency of vortices shed by the shedder is measured.

In a further aspect of the invention, a vortex flowmeter body includes a tubular fluid inlet configured for being coupled in series to an upstream portion of a fluid flow conduit. The fluid inlet fairs into a central bore having a transverse cross-sectional dimension less than that of the conduit. A shedder is disposed within the central bore. The central bore is communicably coupled to a tubular fluid outlet configured for being coupled to a downstream portion of the conduit. The fluid inlet includes a first wall portion disposed upstream of a second wall portion, the second wall portion having a flow disrupter configured to disrupt flow of the process fluid relative to the flow of the fluid upstream thereof.

In a still further aspect of the invention, a vortex flowmeter includes a flowmeter body having a tubular fluid inlet configured for being coupled in series to an upstream portion of the conduit. The fluid inlet fairs into a central bore having a transverse cross-sectional dimension less than that of the conduit. A shedder is disposed within the central bore. The central bore is communicably coupled to a tubular fluid outlet configured for being coupled to a downstream portion of the conduit. The fluid inlet has a stepped inner wall, including a first wall portion disposed at a first angle to the downstream direction, and a second wall portion disposed at a second angle to the downstream direction. The second angle is greater than the first angle, so that the first and second wall portions form a substantially concave axial cross-section. The flowmeter also includes a transmitter disposed to capture the rate of shedding generated by the shedder, and to calculate the flow rate of the process fluid as it flows through the flowmeter body.

BRIEF DESCRIPTION OF THE DRAWINGS

The above and other features and advantages of this invention will be more readily apparent from a reading of the following detailed description of various aspects of the invention taken in conjunction with the accompanying drawings, in which.

DETAILED DESCRIPTION

Figure 1A:
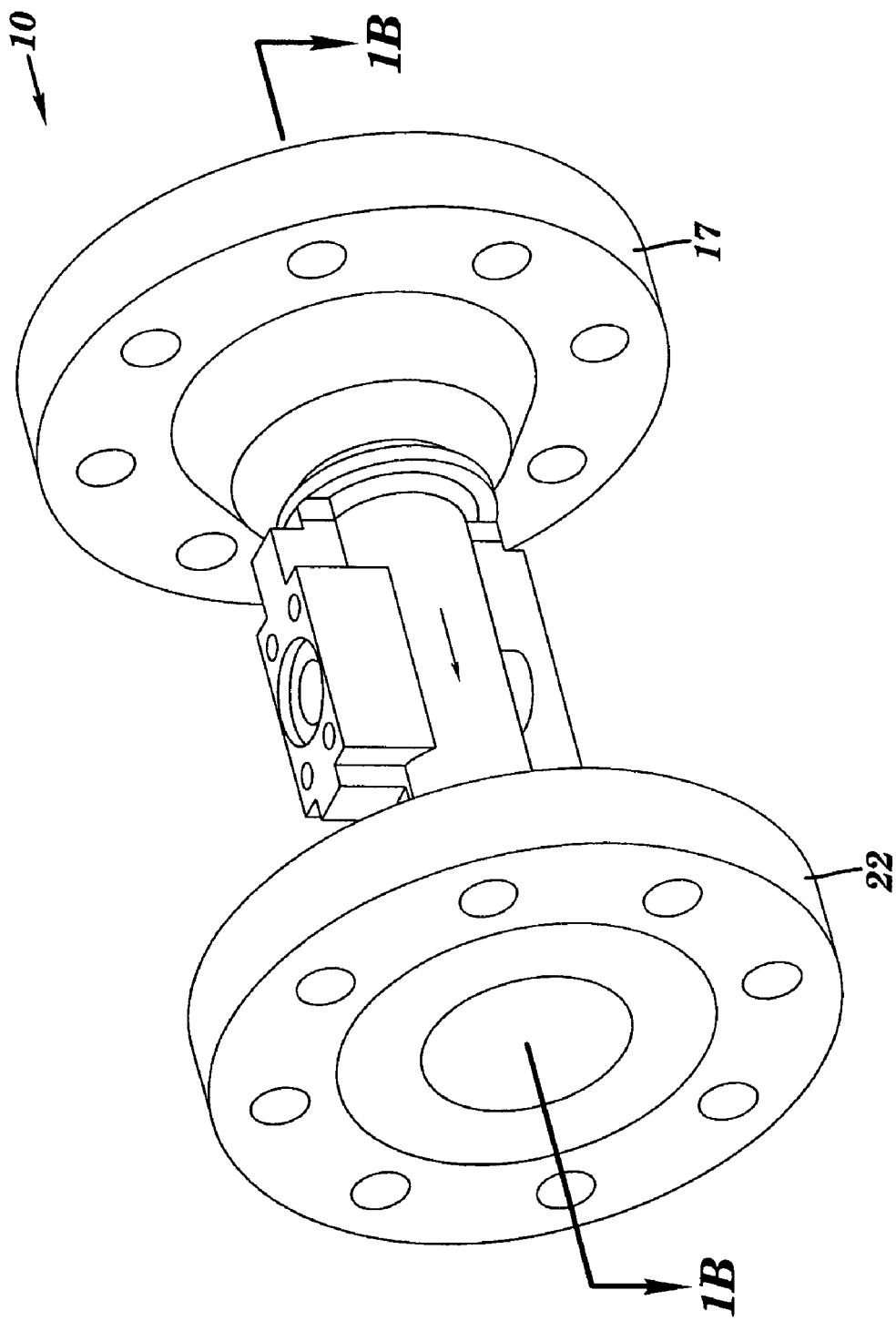
FIG. 1A is a perspective view of an embodiment of the present invention.

In the following detailed description, reference is made to the accompanying drawings that form a part hereof, and in which is shown by way of illustration, specific embodiments in which the invention may be practiced. These embodiments are described in sufficient detail to enable those skilled in the art to practice the invention, and it is to be understood that other embodiments may be utilized. It is also to be understood that structural, procedural and system changes may be made without departing from the spirit and scope of the present invention. The following detailed description is, therefore, not to be taken in a limiting sense, and the scope of the present invention is defined by the appended claims and their equivalents. For clarity of exposition, like features shown in the accompanying drawings are indicated with like reference numerals and similar features as shown in alternate embodiments in the drawings are indicated with similar reference numerals.

Where used in this disclosure, the term "axial" when used in connection with an element described herein, refers to a direction parallel to the flowpath and/or downstream flow of the process solution therethrough. Similarly, the term "transverse" refers to a direction substantially orthogonal to the axial direction. As used herein, the term "1×" size reduction refers to a reduction of one standard size, such as a reduction of an 8 inch to 6 inch, or a 1 inch to ¾ inch bore. Similarly, a "2×" reduction refers to reduction of two standard sizes, such as a reduction of an 8 inch to a 4 inch, or a 2 inch to a 1 inch bore size. Additional size reductions may be referred to as 3×, 4×, etc. The term "0×" reduction refers to any reduction of less than one standard size, such as may be provided by so-called "straight" flowmeters in which the internal dimension of the flowmeter body is reduced relative to that of an upstream fluid flow conduit due to varying pipe thickness schedules, etc.

Embodiments of the present invention include a vortex flowmeter having a central bore which is reduced relative to the size of the process fluid flow conduit into which it is installed. These embodiments have been shown to provide relatively high levels of accuracy and linearity at reductions of 1× and 2× or more. These embodiments may be similarly applied to reductions of less than 1×, such as so-called "straight" or 0× reduction flowmeters.

An aspect of the invention was the discovery that contrary to conventional wisdom, providing a relatively abrupt transition, i.e., a structure or 'step' in the wall of the fluid inlet upstream of the shedder to create a disruption of flow in an otherwise conventional vortex flowmeter, served to enhance the linearity of flow measurements of size-reduced meters. This in turn, enabled the instant inventors to provide reduced bore meters in a relatively wide range of sizes, and with relatively large size reductions, while maintaining this desired linearity. Reductions of nominally any size, e.g., 0×, 1×, 2×, 3×, 4×, or more, may be provided using the teachings of the present invention.

Figure 1B:
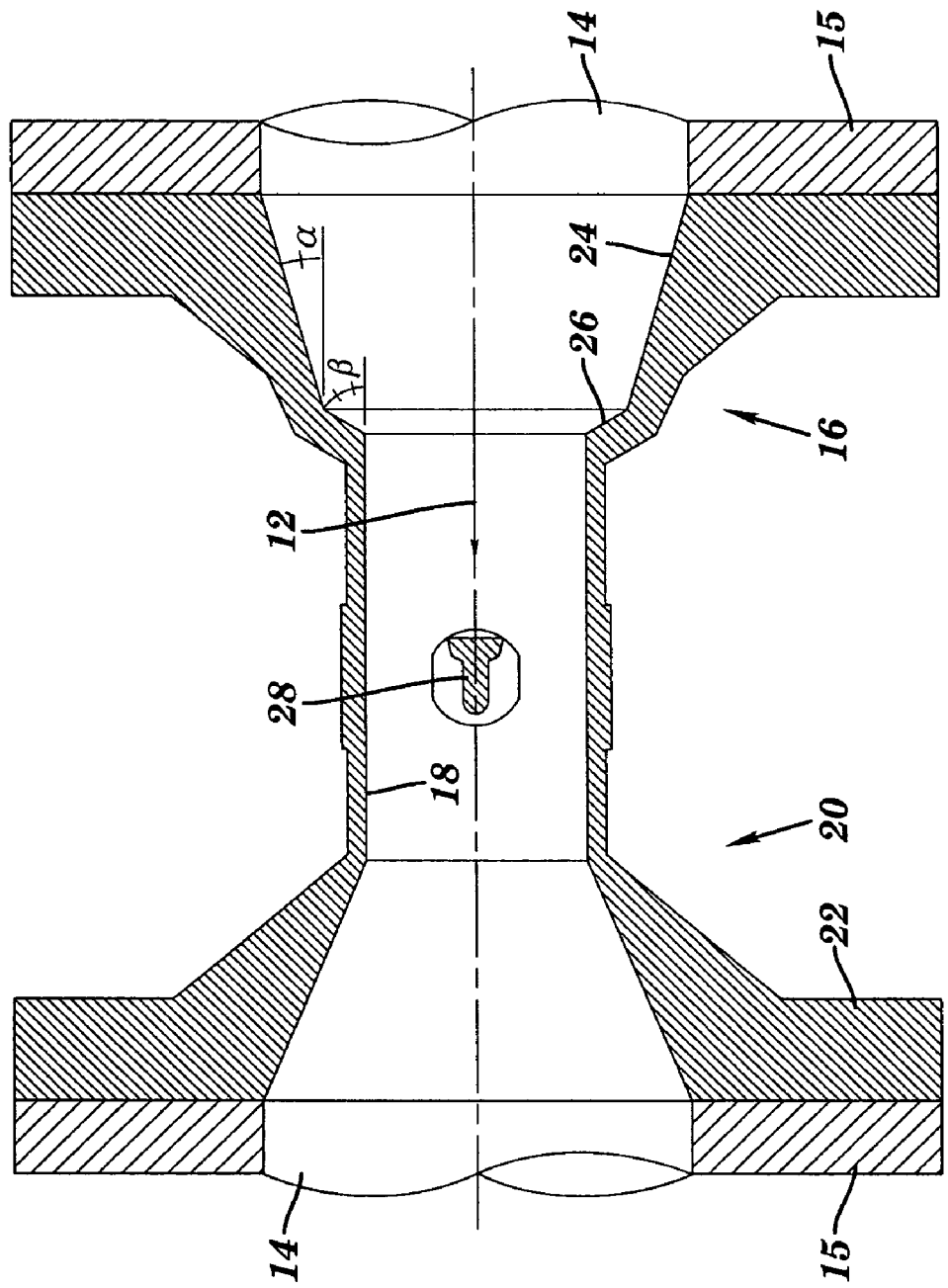
FIG. 1B is a cross-sectional plan view taken along 1B-1B of FIG. 1A.
Figure 1C:
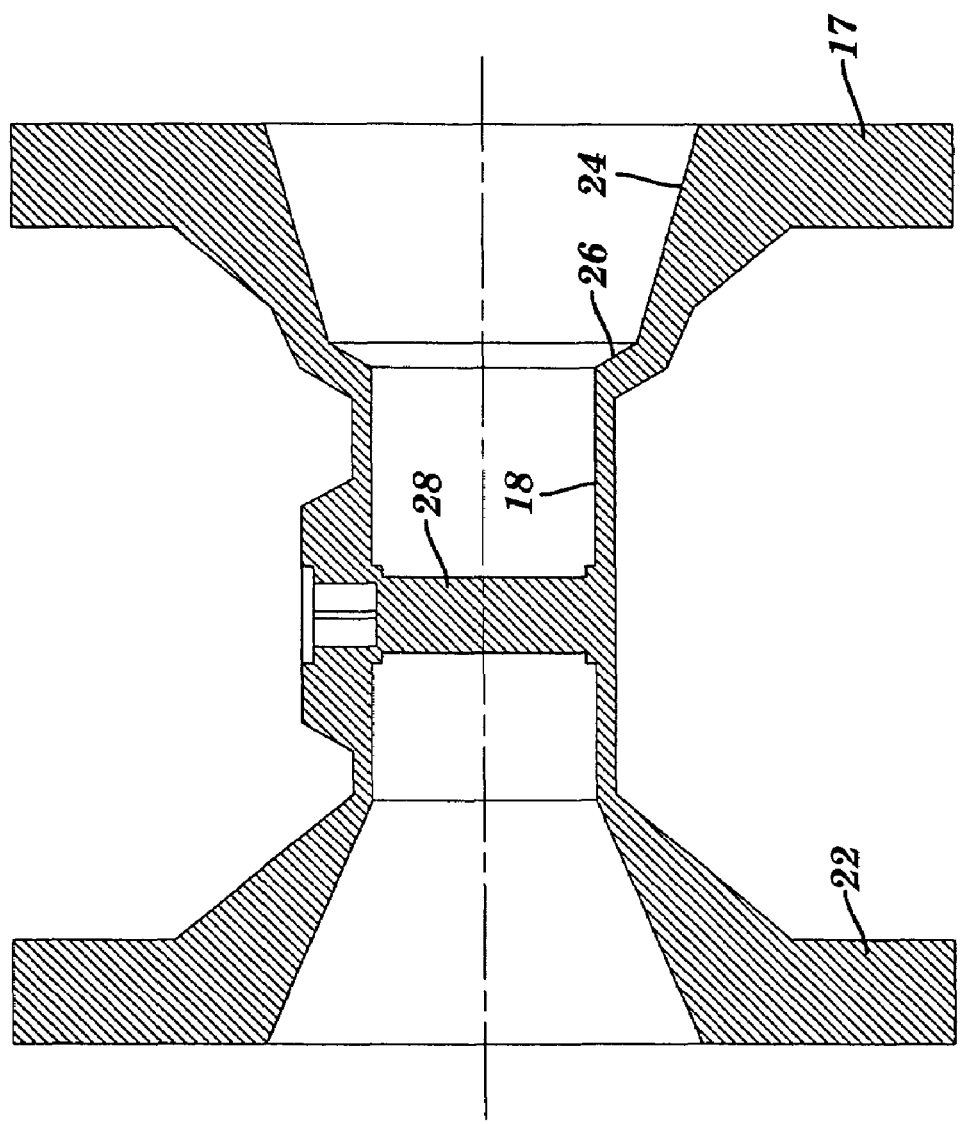
FIG. 1C is a cross-sectional elevational view of the embodiment of FIGS. 1A and 1B.
Figure 1D:
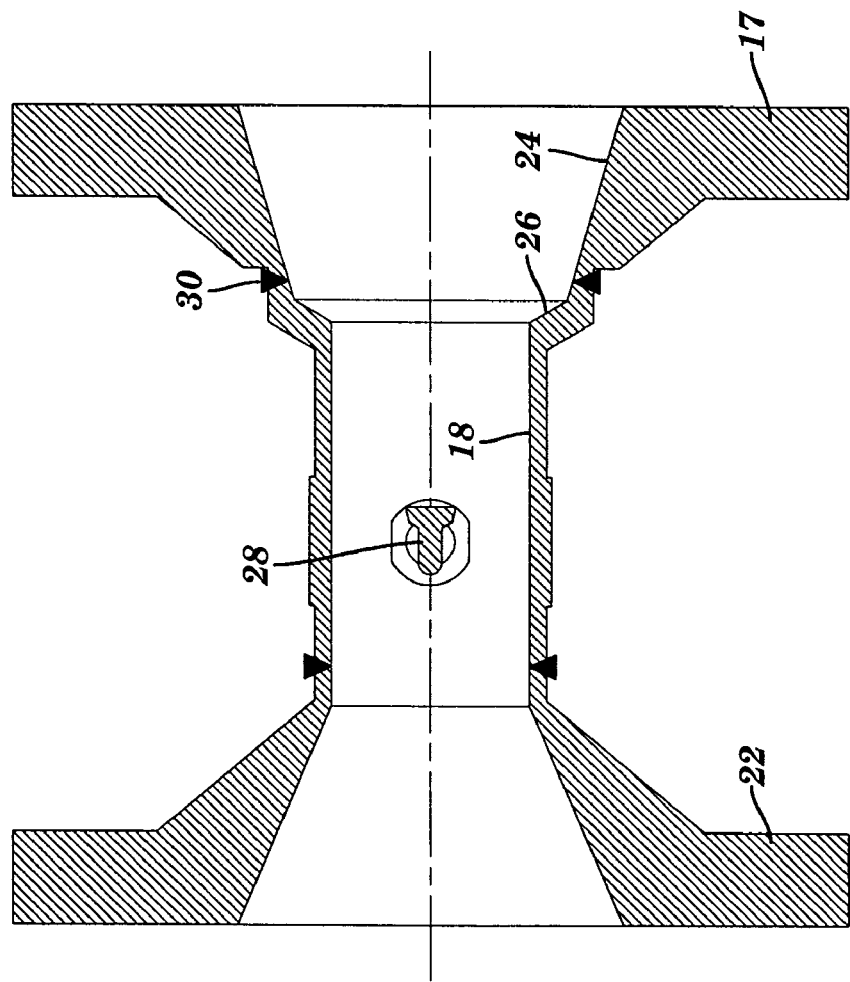
FIG. 1D is a view similar to that of FIG. 1B, of an alternate embodiment of the present invention.
Figure 2:
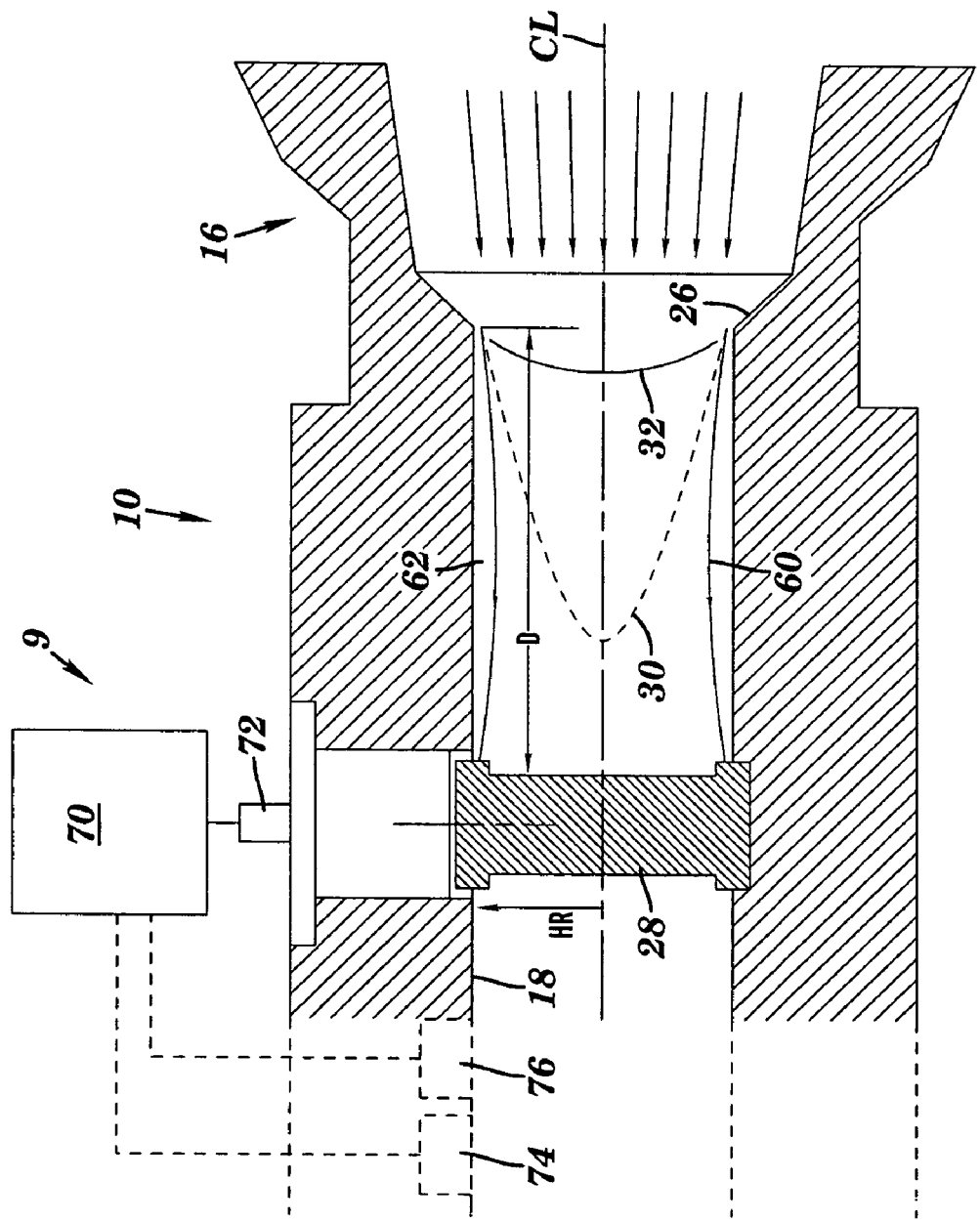
FIG. 2 is a cross-sectional elevational view, on an enlarged scale, of a portion of FIG. 1C.

Turning now to FIGS. 1A-2, an exemplary vortex flowmeter 9 (FIG. 2) includes a flowmeter body (flow tube) 10 including a shedder 28, a sensing element 72 (FIG. 2) such as a pressure sensor disposed to detect pressure pulses associated with vortices generated by shedder 28, and a transmitter (processor) 70 (FIG. 2) communicably coupled to element 72 to capture and process the pulses detected by element 72.

As best shown in FIGS. 1A-1D, flowmeter body 10 is disposed within a process fluid flow conduit 14 (FIG. 1B) configured for conveying process fluid in a downstream direction 12 therethrough. The flowmeter body 10 includes a tubular fluid inlet 16 which includes a flange 17 configured for being coupled in series to an upstream portion of the conduit 14 via a similarly sized and shaped flange 15 (FIG. 1B). (It should be noted that it may be desirable for the inner dimension, e.g., diameter, of the upstream end of inlet 16 to match that of conduit 14. However, these dimensions may be offset from one another without departing from the present invention.) Inlet 16 fairs, in a structured or stepped manner (discussed below), into a central bore 18 having a transverse cross-sectional dimension less than that of the conduit 14. In the example shown, bore 18 is at least two sizes (2×) smaller than that of conduit 14, though embodiments having lesser size reductions (e.g., 0×, 1×) or greater size reductions may be provided. At its downstream end, central bore 18 fairs into a tubular fluid outlet 20 which includes a flange 22 configured for being coupled to a downstream portion of the conduit 14 via a flange 15. It should be noted that although outlet 20 is substantially frusto-conical in the embodiment shown, the outlet may be provided with substantially any geometry, including a stepped or smooth, concave or convex axial profile, without departing from the scope of the present invention.

As mentioned above, fluid inlet 16 includes a stepped or structured inner wall, including a first wall portion 24 disposed at first angle α to the downstream direction, and a second wall portion 26 disposed at a second angle β to the downstream direction. The first portion 24 is disposed upstream of the second portion 26. The particular angles and profiles may be varied depending on aspects of the particular application, such as the size of conduit 14 and the amount of reduction (e.g., 0×, 1×, 2×, etc.). In particular embodiments, angle α may be relatively small, such as zero to about 20 degrees, while angle β may be relatively large, such as from about 15 to 90 degrees or more. In many applications however, it may be desired to maintain the second angle β within a range of about 20 degrees to about 70 degrees, while in still other applications, the second angle β may be maintained within a range about 45 degrees to about 65 degrees. In the particular embodiment shown, an exemplary 2× reduction (3 to 1.5 inch) flowmeter body 10 is provided with an angle α within a range of about 7 to 12 degrees and angle β of about 45 degrees.

In many embodiments, such as those shown, the first wall portions 24 are disposed at a fixed angle α to the downstream direction, e.g., in cylindrical or frusto-conical profiles. However, first wall portions 24 may be provided with nominally any profile, including various concave, convex or concavo-convex configurations. Similarly, the second wall portions may be frusto-conical as shown, though other profiles, such as in the form of a ledge (e.g., extending at a 90 degree angle β) or a curved profile, may be used. Nominally any inlet profiles may be used in the stepped profile of the present invention, as long as a step or other flow-disrupting structure is provided within the flow inlet.

Flowmeter body 10 may be fabricated as one or more discrete components, including the one-piece embodiment of FIGS. 1B, 1C, or the multi-component embodiment of FIG. 1D. For example, both first and second wall portions of fluid inlet 16 may be disposed within flange 17. Alternatively, it may be desirable from a manufacturability standpoint to place the second wall portion 26 at an upstream end of an otherwise conventional middle flow tube portion which includes the bore 18 and shedder 28 as shown. This construction permits the flange 17 to be conveniently fastened to the middle portion by a weld 30 located radially outward of the location of contact thereof.

Fluid outlet 20 may include either a stepped, or a conventional non-stepped frusto-conical profile as shown. As mentioned hereinabove, flowmeter body 10 may be scaled to 0×, 1×, 2×, 3×, 4× or greater size reductions for nominally any size conduit. For example, flowmeter body 10 may be provided with dimensions of 2"×1", 3"×1.5", 4"×2", 6"×3", 8"×4", 10"×6", and 12"×8", for a 2× reduction in line size. Similarly, flowmeter body 10 may be fabricated with 1.5"×1", 2"×1.5", 3"×2", etc., to provide for 1× reductions.

Turning now to FIG. 2, while not wishing to be tied to a particular theory, it is believed that the superior performance exhibited by the embodiments disclosed herein, is provided at least in part by the use of stepped inlet 16 to generate a relatively flat or evenly distributed fluid flow profile 32. As shown, the relative flatness of profile 32 contrasts with the profile 30 (shown in phantom) of an otherwise similar flowmeter body fabricated without stepped inlet 16. It is also believed that inlet 16 generates a contracted flow portion 60 within bore 18 that extends downstream from inlet 16 to shedder 28 to further enhance performance relative to conventional reduced-bore meters.

In this regard, vortex flowmeters operate by measuring the frequency of shedding that occurs as a turbulent flow passes a blunt object (e.g., shedder bar 28) within the flow stream. Such measurement is effected in any convenient manner, such as by transmitter 70 and sensing element 72 as discussed hereinabove. This vortex shedding frequency is directly proportional to the velocity of the fluid in the pipe, and therefore to volumetric flow rate. The shedding frequency is independent of fluid properties such as density, viscosity, conductivity, etc., provided the flow is turbulent and within the range of Reynolds numbers measurable by the flowmeter.

The volumetric flowrate Q is the product of:

$$Q=fK$$

where f is the vortex shedding frequency and K is the meter calibration coefficient or 'K factor'. The K factor is typically defined as pulses per unit volume. Therefore, one can determine flowrate simply by counting the pulses per unit time. Vortex frequencies typically range from one to thousands of pulses per second, depending upon the flow velocity, the character of the process fluid, and the size of the meter. In gas service, for example, frequencies tend to be about 10 times higher than in liquid applications. (Vortex meters have flow limits based upon the flowing density multiplied by the squared value of the flowing velocity. Therefore with gas applications (with lower density values than liquids), the maximum velocity and consequent frequency limit is much higher than liquid applications.)

The K factor is determined by the manufacturer of the particular meter, usually by water calibration in a flow lab. Because the K factor is nominally the same for liquid, gas and vapor applications, the K factor determined from a water calibration is generally valid for other fluids. (However, the accuracy for fluids other than the reference fluid (water) is usually less for gas and steam measurement.)

The inaccuracy of many conventional (i.e., non-reduced bore) vortex meters is 0.5-1% of rate for Reynolds numbers over about 30,000. As the Reynolds number drops, metering error increases. (At Reynolds numbers less than 10,000, error can reach 10% of actual flow.) This inaccuracy, however, tends to be more pronounced when the bore size is reduced, so that typical reduced bore vortex meters have even greater inaccuracies at low Reynolds numbers. This means that reduced bore vortex meters typically have substantially higher minimum Reynolds numbers than conventional meters, at a given inaccuracy cap of +/−1%.

As discussed hereinabove, a conventional vortex flowmeter with a non-stepped, convex inlet generates a relatively steeply curved velocity profile 30 (shown in phantom in FIG. 2) in which the velocity of the flow is lowest at the wall of the inlet, and greatest in the center. However, the stepped inlet 16 of the present invention generates a velocity profile 32 that is flatter or more linear in shape. Thus, the stepped inlet geometry of the present invention generates a fluid velocity that is more uniform across the meter, (i.e., transverse to the downstream direction). It is believed that this aspect tends to reduce velocity profile errors to improve accuracy, e.g., linearity, (and thus, the K factor) of the meter over its operational range.

As also shown in FIG. 2, stepped inlet 16 generates a contracted flow 60 which extends downstream nominally as far as shedder 28 even at relatively low flow rates and/or Reynolds numbers. As shown, contracted flow 60 is a portion of relatively high velocity flow spaced radially inward of the inside diameter of the flowmeter body. This contracted flow 60 is separated from the wall of the flowmeter body by lower velocity fluid that forms an area of separation 62. This area of separation 62 is believed to remain more constant through the flowmeter body, e.g., nominally to shedder 28 as shown, than that formed by the non-stepped construction of the prior art.

Since vortex meters are velocity meters, at a particular flow volume, the frequency of pulses generated by shedder 28 are higher with contracted flow than they would be otherwise, i.e., due to the smaller effective diameter of the flow 60. The resulting K factor (pulses per unit volume) is therefore higher with contracted flow. However, as flow decreases, the degree of contracted flow 60 decreases until it effectively collapses, at which point the effective diameter of the flow increases (due to the lack of separation 62) to occupy nominally the full physical inside diameter of the bore 18. When the pulses per volume are measured at this (collapsed) flow condition, the meter K factor is reduced because the same flow now occupies a greater effective cross sectional area. This changing K factor generally corresponds to a substantial non-linearity in measurement performance. It is believed that the stepped inlet 16 of the present invention maintains this condition of contracted flow down to a lower flow rate (e.g., Reynolds number), resulting in a more uniform (and more accurate) measurement (e.g., K factor), than provided by conventional reduced-bore inlet configurations.

Other factors that may influence profile 32 include the ratio of hydraulic radius HR of bore 18, to distance D between the shedder 28 and step 26. In various embodiments, this ratio HR:D may be in the range of approximately 1:2 to 1:5, with particular embodiments within a range of about 1:2.5 to 1:3.5 as shown. This ratio may be adjusted based upon other parameters associated with a particular application, such as the center line velocity (CLV) of the process fluid, i.e., the fluid velocity at center line CL of the flowmeter body.

This relatively flat fluid flow profile 32 and/or extended contracted flow 60 may be useful in conjunction with multivariable vortex flowmeters. Aspects of the present invention may thus be used in combination with transmitter 70 in the form of a conventional multivariable transmitter (e.g., the Foxboro IMV25 multivariable transmitter from Invensys Systems, Inc.) in combination with optional temperature and pressure sensors (shown schematically, in phantom, at 74, 76) to provide a reduced bore, multivariable vortex flowmeter.

This multivariable vortex meter may measure flow and compute density based on temperature and pressure measurements of the process fluid taken downstream of the shedder bar, prior to exiting the meter through the downstream flange.

In conventional multivariable vortex flowmeters, pressure is not constant within the meter, as their pressure curves indicate an initial drop in pressure, followed by a pressure recovery. For this reason, it is desirable to measure pressure as close as possible to the same point in the pressure curve for various fluid velocities. This pressure variability tends to increase the difficulty of obtaining accurate measurements.

As discussed hereinabove, it has been found that non-uniformities in velocity profiles tend to be exacerbated by conventional reduced diameter flowmeters, particularly at relatively low Reynolds numbers. However, the flatter velocity profile 32 provided by embodiments of the present invention tends to reduce pressure variation within the meter, for improved pressure measurement accuracy throughout a range of fluid velocities. Multivariable vortex flowmeters equipped with the stepped intake of the present invention may thus provide improved predictability and consistency of pressure measurement than prior approaches.

Figure 3:
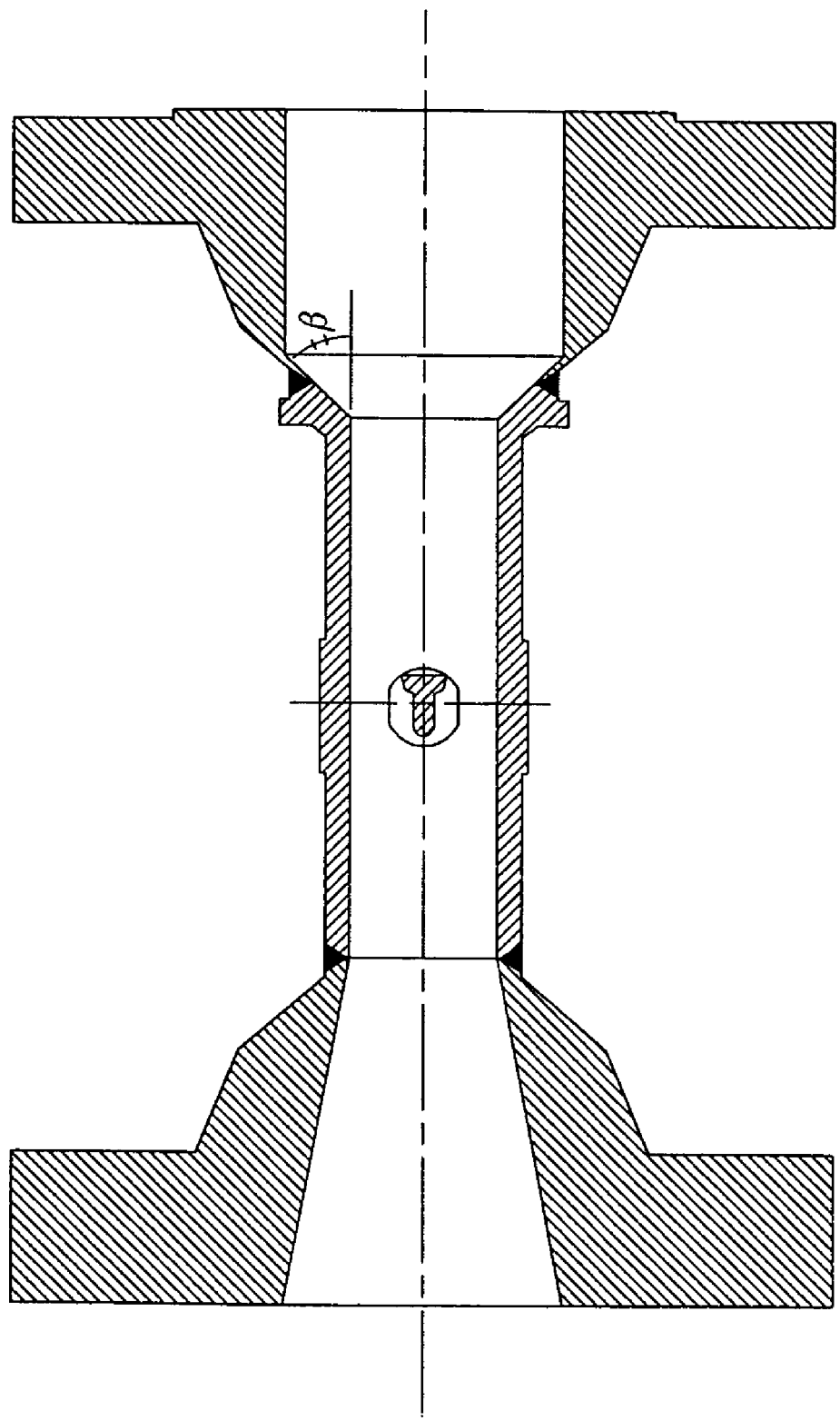
FIG. 3 is a view similar to that of FIG. 1B of an alternate embodiment of the present invention.

As shown in FIG. 3, an alternate embodiment of the present invention is substantially similar to that of FIG. 1, though having an angle α of approximately zero degrees (i.e., zero taper upstream of angle β).

Figure 4:
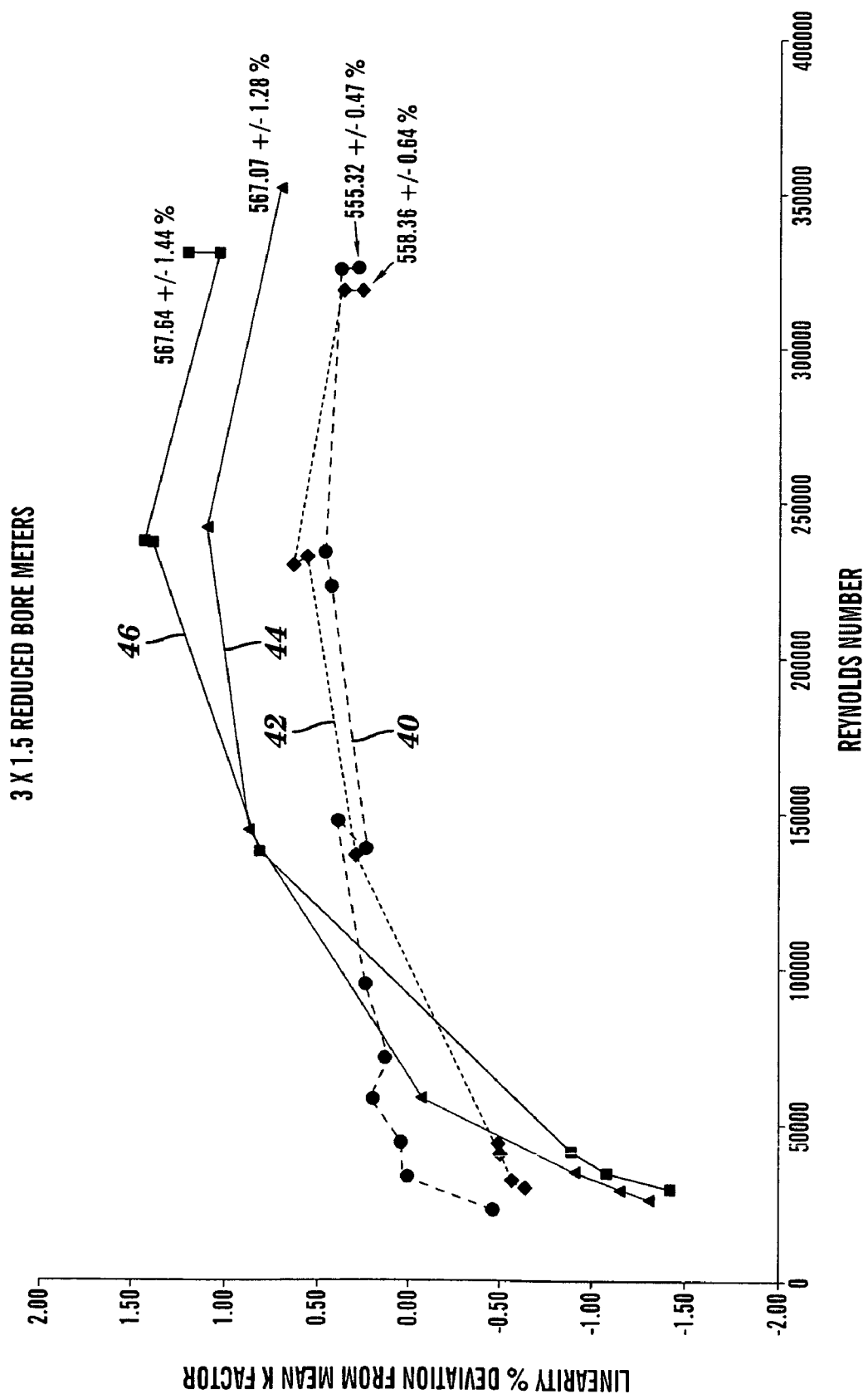
FIG. 4 is a graphical representation of exemplary test results for the embodiment of FIGS. 1A-2.

Examples of the embodiment shown and described hereinabove with respect to FIGS. 1A-1D, having a 2× reduction of 3 inch to 1.5 inch, were built and tested. Referring now to FIG. 4, test results thereof (shown at 40 and 42) were compared to test results (shown at 44 and 46) of similar flowmeters having non-stepped inlets. As shown, the inventive stepped-inlet examples produced results that were substantially more linear (+/− about 0.47% and 0.64%, from mean K Factors of 555.32 and 558.36, respectively) than those of the non-stepped meters (+/−1.28% and 1.44%, from mean K Factors of 567.07 and 567.64, respectively).

Figure 5:
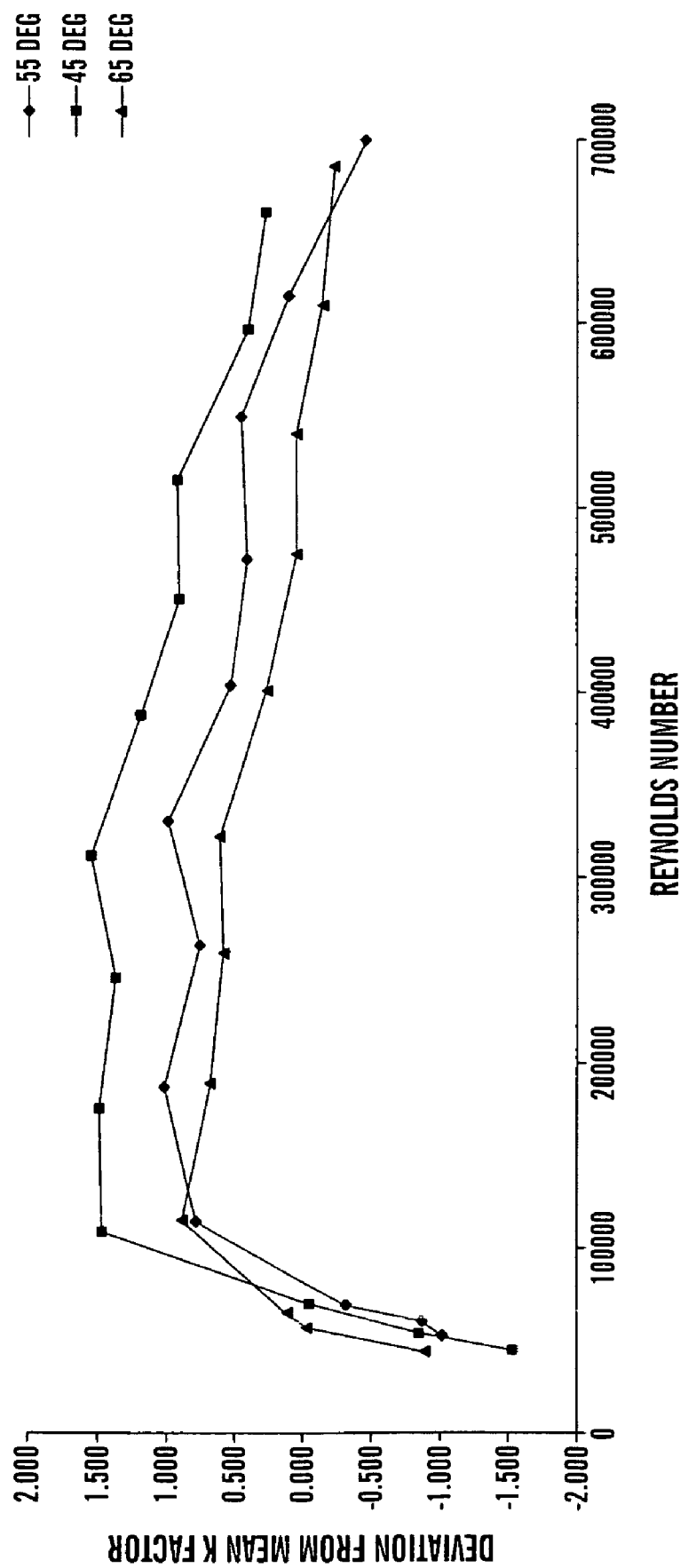
FIG. 5 is a graphical representation comparing test results of additional embodiments of the present invention.

Turning now to FIG. 5, examples of flowmeters with the flowmeter bodies of FIGS. 1A-1D, having a 2× reduction of 6 inch to 3 inch, with an angle α of 7 degrees, and angles β of 45, 55 and 65 degrees, respectively, were compared to one another. As shown, for this size flowmeter body, the 55 degree step (angle β) generated results that were more linear than the 45 degree step, while still better results were achieved by the 65 degree step, which as shown, provided a mean K factor of less than +/−1%. These test results indicate that the larger step angle was more effective at generating contracted flow, even at relatively low flow conditions.

Although embodiments disclosed hereinabove refer to reduced bore sizes of 0×, 1×, 2×, etc., it should be recognized that substantially any amount of reduction in internal size of a flowmeter body relative to that of a fluid flow conduit may be provided without departing from the scope of the present invention.

In the preceding specification, the invention has been described with reference to specific exemplary embodiments thereof. It will be evident that various modifications and changes may be made thereunto without departing from the broader spirit and scope of the invention as set forth in the claims that follow. The specification and drawings are accordingly to be regarded in an illustrative rather than restrictive sense.

Having thus described the invention, what is claimed is:

1. A vortex flowmeter body adapted for use within a process fluid flow conduit configured for conveying process fluid in a downstream direction therethrough, said flowmeter body comprising:

a tubular fluid inlet configured for being coupled in series to an upstream portion of the conduit;

said fluid inlet fairing into a central bore having a transverse cross-sectional dimension less than that of the conduit;

a shedder disposed within said central bore;

said central bore communicably coupled to a tubular fluid outlet;

said fluid outlet configured for being coupled to a downstream portion of the conduit;

said fluid inlet having a stepped inner wall, including a first wall portion disposed at first angle to the downstream direction, and forming a substantially abrupt intersection with a second wall portion disposed at a second angle to the downstream direction;

said second angle being greater than said first angle, wherein said first and second wall portions form a substantially rectilinear, concave axial cross-section.

2. A vortex flowmeter, comprising:

the flowmeter body of claim 1;

a sensing element coupled to the flowmeter body and configured to detect vortices generated by said shedder; and a transmitter coupled to the flowmeter body and configured to:

capture the frequency of vortices generated by said shedder; and use the frequency to calculate the flow rate of the process fluid as it flows through the flowmeter body.

3. A multivariable reduced bore vortex flowmeter for use within a process fluid flow conduit configured for conveying process fluid in a downstream direction therethrough, said flowmeter comprising:

the flowmeter of claim 2;

a temperature sensor coupled to the flowmeter body and configured to generate temperature data for the process fluid; and a pressure sensor coupled to the flowmeter body and configured to generate pressure data for the process fluid downstream of said shedder.

4. The flowmeter of claim 3, wherein said transmitter comprises a multivariable transmitter configured to capture the temperature and pressure data.

5. The flowmeter body of claim 1, wherein said stepped inner wall is sized and shaped to generate a transversely contracted flow portion extending downstream from the second wall portion towards said shedder.

6. The flowmeter body of claim 5, wherein said contracted flow portion extends at least 75 percent of the axial distance from said second wall portion to said shedder.

7. The flowmeter body of claim 5, wherein said transversely contracted flow portion is disposed within an area of separation defined by process fluid flowing at a velocity of about 50 percent or less than that of said contracted flow portion.

8. The flowmeter body of claim 1, wherein said second angle is:

at least about 15 degrees; and up to about 90 degrees.

9. The flowmeter body of claim 8, wherein said second angle is within a range of:

at least about 20 degrees; and up to about 70 degrees.

10. The flowmeter body of claim 9, wherein said second angle is within a range of:

at least about 45 degrees; and up to about 65 degrees.

11. The flowmeter body of claim 1, wherein said second wall portion terminates at said central bore.

12. The flowmeter body of claim 1, wherein said central bore is defined by a wall parallel to the downstream direction.

13. The flowmeter body of claim 1, wherein said first angle is within a range of about 0 degrees to about 20 degrees.

14. The flowmeter body of claim 1, wherein said first and second wall portions are frusto-conical.

15. The flowmeter body of claim 1, comprising an upstream flange, a middle portion, and a downstream flange, wherein said fluid inlet includes said upstream flange and an upstream end of said middle portion.

16. The flowmeter body of claim 15, wherein said middle portion comprises said central bore and said second wall portion.

17. The flowmeter body of claim 15, wherein said upstream flange and said middle portion are fastened by welding radially outward of a location of contact thereof.

18. The flowmeter body of claim 1, wherein said tubular fluid outlet is frusto-conical.

19. The flowmeter body of claim 1, wherein a ratio HR:D of hydraulic radius (HR) of said central bore, to axial distance (D) between said shedder and said second wall portion is within a range of approximately 1:2 to 1:5.

20. The flowmeter body of claim 19, wherein said ratio HR:D is within a range of about 1:2.5 to 1:3.5.

21. The flowmeter body of claim 1, wherein said transverse cross-sectional dimension of said central bore is reduced relative to that of the conduit by a reduction selected from the group consisting of 0×, 1×, 2×, 3× or 4×.

22. A method of measuring fluid flow within a flow conduit configured for conveying process fluid in a downstream direction therethrough, said method comprising:
(a) coupling a tubular fluid inlet in series to an upstream portion of the conduit, the fluid inlet having a stepped inner wall, including a first wall portion disposed at first angle to the downstream direction, and forming a substantially abrupt intersection with a second wall portion disposed at a second angle to the downstream direction, the second wall portion disposed downstream of the first wall portion, and the second angle being larger than the first angle, wherein the first and second wall portions form a substantially rectilinear, concave axial cross-section;
(b) coupling the fluid inlet to a central bore having a transverse cross-sectional dimension less than that of the conduit, the central bore having a shedder disposed therein;
(c) coupling the central bore to a tubular fluid outlet;
(d) coupling the fluid outlet to a downstream portion of the conduit;
(e) conveying the process fluid downstream through the conduit; and
(f) measuring the frequency of vortices shed by the shedder during said conveying (e).

23. A vortex flowmeter body adapted for use with a process fluid flow conduit configured for conveying process fluid in a downstream direction therethrough, said flowmeter body comprising:
a tubular fluid inlet configured for being coupled in series to an upstream portion of the conduit;
said fluid inlet fairing into a central bore having a transverse cross-sectional dimension less than that of the conduit;
a shedder disposed within said central bore;
said central bore communicably coupled to a tubular fluid outlet;
said fluid outlet configured for being coupled to a downstream portion of the conduit;
said fluid inlet including a first wall portion disposed upstream of a second wall portion, said second wall portion having a flow disrupter configured to form a substantially abrupt intersection with the first wall portion to disrupt flow of the process fluid relative to flow of the fluid upstream thereof.

24. A vortex flowmeter adapted for use within a process fluid flow conduit configured for conveying process fluid in a downstream direction therethrough, said flowmeter comprising:
a flowmeter body including:
a tubular fluid inlet configured for being coupled in series to an upstream portion of the conduit;
said fluid inlet fairing into a central bore having a transverse cross-sectional dimension less than that of the conduit;
a shedder disposed within said central bore;
said central bore communicably coupled to a tubular fluid outlet;
said fluid outlet configured for being coupled to a downstream portion of the conduit;
said fluid inlet having a stepped inner wall, including a first wall portion disposed at a first angle to the downstream direction, and forming a substantially abrupt intersection with a second wall portion disposed at a second angle to the downstream direction;
said second angle being greater than said first angle, wherein said first and second wall portions form a substantially rectilinear concave axial cross-section;
a sensing element coupled to the flowmeter body and configured to detect vortices generated by said shedder; and
a transmitter coupled to the flowmeter body and configured to:
capture the rate of shedding generated by said shedder; and
calculate the flow rate of the process fluid as it flows through the flowmeter body.

* * * * *